Patented Feb. 10, 1953

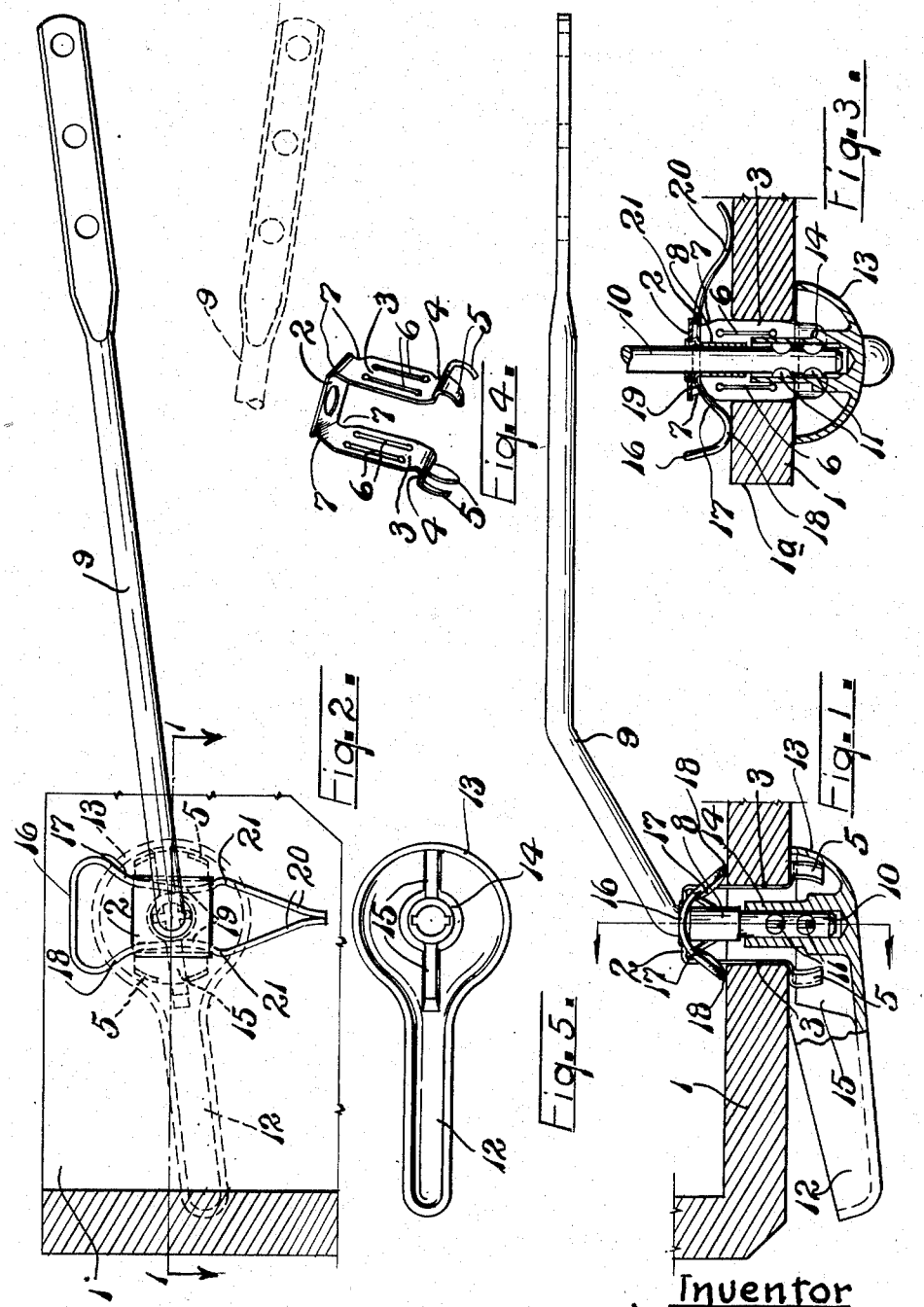

2,627,607

UNITED STATES PATENT OFFICE 2,627,607

FLUSH TANK LEVER

Basil R. Crampton, Rockford, Mich.

Application October 2, 1950, Serial No. 187,852

8 Claims. (Cl. 4—67)

This invention relates to a novel and very practical, economically constructed flush tank lever.

The usual flush tank lever includes a mounting fixture or "spud," as it is generally known, which is insertable through an opening in the front wall and near the upper edge of a flush tank, usually being a metal casting and having an outside head to bear against the outer side of the tank wall, from which a portion, generally square in cross section, extends for a distance, in correspondence to the cross sectional area of the square opening through the wall, and at its inner end portion beyond the inner side of the wall, it is screw threaded to receive a nut for clamping or binding the spud in place to the wall. Such clamping nut cannot be tightened too strongly without danger of fracturing the relatively fragile wall of the tank. The nut is also susceptible to loosening so that the throw of the lever is changed, the square cross sectional portion of the spud not conforming snugly to the opening of the tank wall through which the spud is inserted. The spud thereupon, in many instances, has a limited rocking movement so that the proper throw of the tank lever is changed. Such opening through which the spud passes in general will have an overall tolerance amounting to at least $\frac{1}{16}$ of an inch and some cases $\frac{3}{32}$ of an inch difference in dimensions between openings of the smallest cross sectional area and those of the largest.

Furthermore the spud substantially universally used requires expensive equipment for its casting and machining, while the assembly of the tank lever on the tank is slowed up because of the necessity of screwing the clamping nut on to the threaded portion of the spud, requiring several turns of the nut which, in many instances, must be made entirely about a wrench when the dimensions of the threaded portion of the spud with respect to the interior threads of the nut are close, so that the nut is tight upon the threads of the stud which it traverses.

The lever to which the ball valve is connected at one end of the lever is mounted for rocking movement on the spud, and is limited in the amount of such rocking movement, for governing the throw of the lever.

It is an object and purpose of the present invention to eliminate the cast metal spud, the threading thereof and the clamping nut, substituting a spud of sheet metal which is very rapidly and economically produced in large quantity production by punch press operations, and to provide such spud with a novel structure such that it conforms to the dimensions of the opening in the wall of the tank through which it is inserted over the varying ranges of dimensions of such openings which are met in practice. It is a further object of the invention to provide a very practical, simple, novel and economical holding or retaining means for securely connecting the spud in place after it has been inserted through the tank wall opening, eliminating the screw threaded nut previously used. Such novel securing means used in the present invention may be connected with the spud of the flush tank lever very quickly and in substantially one quarter of the time previously used for screwing on the clamping nut and tightening it against the wall of the tank. Such holding or securing means also provides at all times a pull upon the spud to hold its outer end portion snugly against the outer side of the wall of the tank, there being no development of looseness in connection with the spud. And with my invention the throw of the movable lever part of the structure remains constant and does not change.

Furthermore, with my invention, it is an object and purpose to provide a completely assembled flush tank lever, exactly as it is when mounted on the tank except that the spud holding or securing means is not in the place on the lever where it will be when attached to a flush tank, so that in the installation the end of the lever to which the ball valve is connected is inserted through the opening in the wall of the tank from the outside, and is followed by the passage of the novel spud of my invention into said opening in the tank wall until stopped against the outer side of the wall with an operating handle at the outer side of the wall for rocking the lever the predetermined throw which it has in use. After the lever has thus been put in place the resilient holding or securing means is substantially instantly inserted through the inner projecting end portion of the spud, riding and bearing against the inner side of the tank wall at its ends and exerting a pull or tension upon the spud at its middle portion. Both in structure and in the assembly of the lever upon the tank there is a marked saving in cost, the cost of manufacture of the lever being reduced, and the time of assembly being greatly reduced with attendant less labor costs for assembling.

An understanding of the invention may be had from the following description, taken in connection with the accompanying drawing, in which, Fig. 1 is a partial section and plan view showing the novel tank lever of my invention assembled with the wall of a tank, the plane of the section being substantially that indicated at the line 1—1 of Fig. 2.

Fig. 2 is an inside elevation of the tank lever mounted upon the tank wall.

Fig. 3 is a transverse section substantially on the plane of line 3—3 of Fig. 1 through the wall of the tank and through the adjacent portions of the assembled tank lever.

Fig. 4 is a perspective view of the novel spud used in my invention, and

Fig. 5 is an inside elevation of the operating handle forming a part of the movable lever and which is accessible for operation at the outside of the tank.

Like reference characters refer to like parts in the different figures of the drawing.

A fragmentary portion of the front tank wall, indicated at 1, has the usual square opening through it for the passage of the spud of the flush tank lever. The spud, shown in Fig. 4, is made from a single length of flat metal into a generally U-shape form, having an end 2 through which a central opening is made, and two spaced sides 3, bent therefrom, which while generally parallel, preferably diverge outwardly from each other away and extend a distance from the end 2 being thence bent outwardly in opposite directions to make ledges 4 which are continued each in two spaced tongues or ears 5 bent therefrom as shown. Each of the sides 3 has two elongated slots 6 therein, one spaced a short distance from each edge of the associated side 3, so that the portions of the sides 3 outwardly from said slots may be pressed or sprung or bowed outwardly thus increasing the width of the sides 3 at their intermediate portions. Also at each edge of each side 3 adjacent the juncture with the end 2 of the spud, recesses 7 are made for a purpose hereinafter appearing.

The spud is completed by a thin metal ferrule 8 of cylindrical form, one end of which has a permanent connection with the end 2 of the spud and which extends therefrom, between the sides 3, for a distance equal substantially to about one-half of the length of said sides as shown in Figs. 1 and 3.

Associated with the spud and rockingly mounted thereon is a lever member 9 which preferably is a rod of suitable metallic material which, at one end, is flattened as shown and has a number of spaced openings therethrough for an adjustable connection of the wire to which the flush tank ball valve is connected in the usual manner. At the opposite end portion of the rod 9 it terminates in an integral spindle 10 bent at right angles substantially, at opposite sides of which spaced outwardly projecting lugs 11 are pressed. Such stem 10 is inserted through the ferrule 8 before the lugs 11 are pressed therefrom.

An operating handle 12 is permanently secured to the end portion of the stem 10. The handle 12, preferably, is a die or other casting, at one end has an enlarged generally dome-like structure as shown at 13, and from the central portion thereof an inwardly cast socket member 14 extends having an axial opening into which the terminal portion of the stem 10 is inserted by a press or drive fit. Suitable shallow slots, as shown in Fig. 5, serve as guides for the projecting lugs 11. The press, drive or squeeze connection of the stem 10 and the part 14 makes a permanent and secure joinder of the operating handle and the lever arm 9. From the dome portion of the handle an integral rib 15 extends toward the spud. The rib at its free edge portions enters the slots between the spaced fingers 5. The width of said slots between the fingers 5 is greater than the thickness of the rib 15 so that a limited rocking movement of the lever arm is permitted.

The flush tank lever as described is mounted on the tank wall by passing the free end of the lever arm 9 through the square opening in the wall and forcing the spud into such opening until the ledges at 4 come against the outer side of the wall 1. The diverging sides 3 will be pressed together and lie against opposite sides of the opening through the wall and be substantially parallel to each other. The outwardly extending portions of the sides 3, outwardly from each of the slots 6 therein, will ride against the remaining sides of the wall opening, yielding sufficiently so that the spud is readily and easily pressed into the opening. The spud is thereupon held against rocking movement when upon a downward push upon the handle 12, the web 15 comes against the edges of two of the tongues 5 one at each side of the stem 10. Such yielding of the spud in both directions permits a design of the spud so that it does not change position with reference to the tank wall, and the throw of the lever remains substantially the same at all times.

The end closure 2 of the spud, when the lever has been mounted with the spud extending through the opening in the tank wall, is spaced inwardly a short distance from the inner side of the wall 1. The securing means comprises a member made from spring wire of a generally U-shaped or hair pin form. At its middle portion it is bent into a middle section 16 which has diverging downwardly extending sides and is then continued in two oppositely extending converging sections 17 of opposed sides of the member with a reversely curved connecting portion between as indicated at 18. The sections 17 are continued in relatively long middle portions 19 which terminate in converging sections 20 the ends of which are curved so as to extend outwardly from the inner side of the tank wall when the holding member is inserted by entering the two sides or legs at their free ends into the open upper side of the spud between the sides 3 and within the connecting end 2. The bends at 18 will ride over the upper edge of the tank wall and bear against the inner side thereof, while the terminal curved portions 20 will also bear against the inner side of the tank wall, such sides or legs of the securing device at their intermediate sections 19 pressing against the inner side of the end 2 of the spud. The intermediate sections 19 are thereupon stressed and remain under tension, exerting a pull upon the spud so as to hold the ledges at 4 snugly against the outer side of the tank wall.

It is apparent that the insertion of the hair-pin securing member is accomplished almost in no time. Preferably, each of the sides or legs thereof will be laterally offset between the ends thereof as at 21 so that when the holding or securing member is fully moved to its operative position, such laterally offset parts 21 will serve as retaining shoulders against the edges of the sides 3 of the spud, to insure against any working outwardly of the securing member and to maintain it in its assembled operative position.

The flush tank lever constructed as described is completely fabricated and assembled before shipment to the user. The spring wire spud securing member preferably will embrace the inner end of the spud, one side or leg thereof being at each of the edges of the sides 3 of the spud at the recesses at 7, into which the sides or legs of the holding member seat. The securing means for each lever therefor will accompany it in a position so that, in installation, it may be grasped and removed by one hand of the workman during the installing, the lever inserted through the tank opening by the other hand, and then the securing means immediately pushed into place. The time of installation is very greatly reduced over the nut clamping means heretofore substantially universally used in practice.

The construction described is very economical to manufacture and install, requires no expensive machinery for fabricating the parts, all parts being readily produced by means of dies, except the handle which is a simple casting operation. The invention is defined in the appended claims and is to be considered comprehensive of all forms of structure coming within their scope.

I claim:

1. A spud mounting for a flush tank lever comprising, a generally U-shaped member of sheet metal having spaced apart sides and an integral connecting end with an opening through which a rockably mounted lever is adapted to pass, said sides being adapted to bear against opposite sides of a transverse opening in a flush tank wall through which the spud is insertable, the sides of said spud at their other ends having outwardly extending portions adapted to bear against the outer side of the wall of the tank adjacent said opening to limit the extent of passage of the spud through said opening, and a resilient member adapted to be removably inserted between the spaced sides of the spud and bear against the cross connecting portion thereof and adapted to bear against the inner side of a tank wall in which the spud is inserted.

2. A structure as defined in claim 1, each of said spud sides having longitudinal slots, one adjacent and spaced inwardly a short distance from and generally parallel to each edge of each of said sides of the spud.

3. In a flush tank lever, a spud of a generally U-shaped form having spaced sides of sheet metal and an integral cross connecting portion connecting said sides at one end thereof, said sides at the opposite end having means adapted to bear against the outer side of a tank wall and, said connecting portion between the sides being adapted to extend a distance beyond the inner side of said tank wall when the spud is inserted through a transverse opening through the tank wall, a lever having an arm located at the inner end of the spud and having a stem substantially at right angles to said arm extending through the cross connecting portion of the spud, a handle permanently secured at the outer portion of said stem, and a resilient retaining member insertable between the sides of the spud having intermediate portions adapted to bear with yielding spring pressure against said cross connecting portion of the spud, and having portions to each side of said intermediate portions adapted to bear against the inner side of the tank wall.

4. A structure as defined in claim 3, said resilient retaining member comprising a length of spring wire of generally U-shape form, having spaced legs integrally connected at one end, each of said legs having an intermediate portion to bear against the connecting portion of said spud between the sides of the spud, and portions, one at each side of the connecting portion, to bear against the inner side of a tank wall, said connecting portion between the legs of the retaining member being located at an angle to the plane of said legs, whereby when inserted through the spud said connecting portion extends upwardly from the inner side of a tank wall in a position to be accessible for pressure thereagainst to force it through said spud.

5. A flush tank lever comprising, a spud of sheet metal of a generally U-shaped form having two spaced flat sides connected at one end by an integral cross member, said cross member having a generally central opening therethrough, said sides of the spud adjacent their opposite ends having outwardly extending portions adapted to bear against the outer side of a tank wall through a transverse opening in which said spud is adapted to be inserted, a lever including a lever arm and a stem at one end of the lever arm located generally at right angles to said arm, said stem extending through said cross connecting portion of the spud, a handle having a central socket member into which the outer end portion of said stem is received and in which it is permanently connected, and inter-engaging means on said handle and spud permitting a preselected limited rocking movement of the handle stem and spud about the axis of said stem.

6. A structure as defined in claim 5, and a generally U-shaped retaining member of spring material having two spaced legs insertable through said spud between the sides thereof, and having intermediate resilient portions adapted to bear against the cross connecting member between the sides of the spud, said intermediate portions of said legs being of a generally curved form and having at each side thereof curved portions spaced from said intermediate portion adapted to bear against the inner side of a tank wall through which the spud is insertable, with the lever arm at the inner side of the wall and the handle at the outer side thereof.

7. A structure as defined in claim 6, each of said legs of said retaining member having means thereon releasably engageable with said spud to yieldingly resist disconnection of the retaining member therefrom.

8. In a flush tank lever, a generally U-shaped spud of flat metal having spaced sides and a cross member integrally connecting said sides at one end, said connecting member having a centrally disposed opening therethrough, a sheet metal ferrule secured to said connecting member extending therefrom in the same direction as the sides of the spud, a lever including a lever arm and a spindle connected therewith at one end, said spindle being disposed substantially at right angles to said arm and said spindle passing through said ferrule, a handle secured to the free end portion of the spindle, cooperating inter-engaging means on said handle and spud to limit movement of said lever to a predetermined rocking movement about the axis of the spud, and a resilient retaining member insertable through said spud between the sides thereof and having means to bear against said cross connecting member and adapted to bear against the inner side of a flush tank, through a transverse opening in which said spud is adapted to be inserted, said spud sides each having means adjacent the free ends thereof adapted to bear against the outer side of a tank wall, to thereby secure the spud against outward movement when engaged by the retaining member.

BASIL R. CRAMPTON.

REFERENCES CITED

The following references are of record in the file of this patent:

UNITED STATES PATENTS

| Number | Name | Date |
| --- | --- | --- |
| Re. 22,543 | Tinnerman | Sept. 5, 1944 |
| 1,999,454 | Haan | Apr. 30, 1935 |
| 2,336,153 | Ryder | Dec. 7, 1943 |
| 2,398,784 | Gisondi | Apr. 23, 1946 |
| 2,502,539 | Tinnerman | Apr. 4, 1950 |
| 2,529,844 | Keller | Nov. 14, 1950 |